I. Pardee.
Scuffle-Hoe & Garden-Trimmer.
Nº 76288. Patented Mar. 31, 1868.
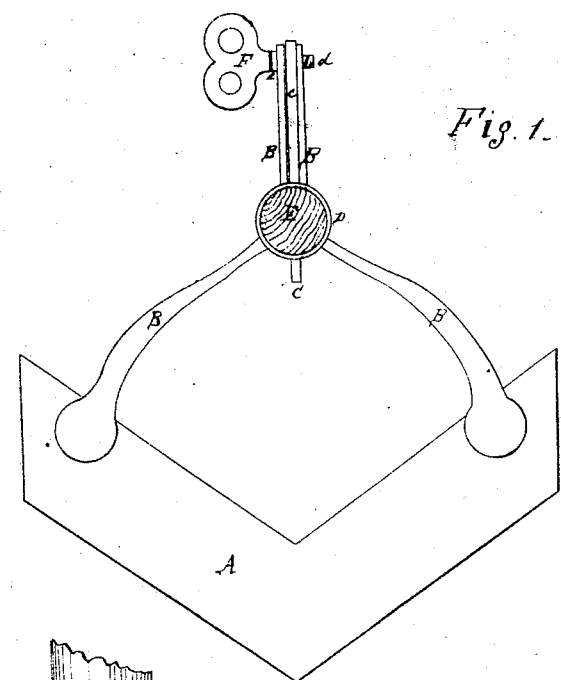
Fig. 1.
Fig. 2.
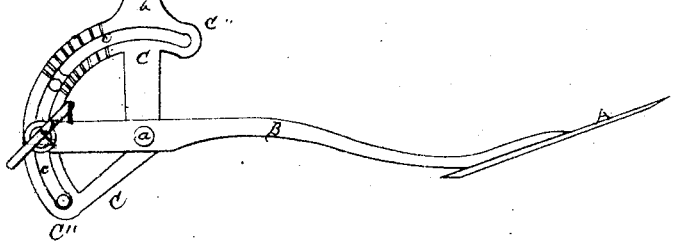
Inventor
Isaac Pardee.
Witnesses
J. C. Theake
S. M. Pool

United States Patent Office.

ISAAC PARDEE, OF VINELAND, NEW JERSEY, ASSIGNOR TO HIMSELF AND ARIAL C. COTTON, OF SAME PLACE.

Letters Patent No. 76,288, dated March 31, 1868.

IMPROVEMENT IN SCUFFLE-HOE AND GARDEN-TRIMMER.

The Schedule referred to in these Letters Patent and making part of the same.

TO ALL WHOM IT MAY CONCERN:

Be it known that I, ISAAC PARDEE, of Vineland, in the county of Cumberland, and State of New Jersey, have invented a new and useful Improvement in Scuffle-Hoe and Garden-Trimmer; and I do hereby declare that the following is a full, clear, and exact description thereof, reference being had to the accompanying drawings.

The nature of my invention consists in so forming the scuffle-hoe that it can be used as a trimmer for trimming the borders of beds or plats along the walks in the garden, and also to hoe or cultivate the vegetables as desired, and this either by a drawing or pushing motion, as may be preferred.

To enable others skilled in the art to which it appertains to make and use my invention, I describe it as follows, viz:

I take a sheet of steel or any other suitable metal, of any suitable thickness, say about one-sixteenth of an inch, and from it I cut out in any convenient way, an angular piece, A, figs. 1 and 2, which piece may be of any desired angle and size, all the edges of which I make sharp. I then attach said piece to the arms B, figs. 1 and 2, by rivets or screws. These pieces B are so formed that so many of them as come in contact with the piece C are parallel with each other, and a proper distance apart to admit the piece C between them, as seen in fig. 1, at B C B. The piece C is formed with a tang, which is driven or screwed into the handle E, as seen at $b$, fig. 2, and it extends out from the handle in a line therewith, about two and one-half ($2\frac{1}{2}$) inches, and from that point it extends at an angle of about forty-five degrees for about two and a quarter ($2\frac{1}{4}$) inches, as seen at C′, and then from that point marked C″, a segment of a circle commences, which extends to and past the tang $b$, to the point C‴. This segment is about three-fourths ($\frac{3}{4}$) of an inch broad, and is struck from the centre at $a$, and in this segment is a slot, $c$, also having $a$ for its centre. The arms B are connected to the piece C by a rivet, as seen at $a$, fig. 2, the centre of this rivet being the point from which the segment and its slot $c$ is struck. This rivet is so fastened in its place that the arms will swing freely on it. These arms B extend past the rivet to the exterior of the said segment, and at a point on them corresponding with the slot $c$, there is a hole drilled through them of a diameter about equal to the width of the slot. In these holes is placed a screw, F, figs. 1 and 2, a thread being cut on it, at or near its end, $d$, and a corresponding thread being cut in the arm B next to $d$, and a shoulder being formed on said screw at the opposite side of the opposite arm B, as seen at $e$, fig. 1, it follows that if this thumb-screw is turned in the right direction forcibly, it will draw towards each other strongly the arms B B, and between them pinch the piece C, and thus hold the arms rigidly in any desired position; but if this pinch just mentioned is not sufficient to hold them in the desired position, I form radial serrations on the sides of the segment C, and corresponding serrations on the insides of that part of the arms which comes in contact with the segment.

It will be seen from the foregoing that if I unscrew the thumb-screw, and move it to the end of the slot at C″, I have the plate A standing in a coming direction, and if I place it at the point C‴, the plate A will stand from me, and, as will be seen, I can place it at any desired angle between the two points mentioned, or, if thought best, instead of the slot $e$, I can have a series of holes in a segmental line corresponding with the centre of the segment, and then, when a change of direction of the plate A is desired, I take out the thumb-screw, and place it in the hole which will give the desired direction, and then screw it fast.

Having thus described my invention, what I claim, and desire to secure by Letters Patent, is—

The combination of the angular plate A, arms B B, and piece C, substantially as shown and described, and for the purpose specified, and that whether with the slot $e$, or a series of holes as described, in its stead, and whether with or without the radial serrations mentioned.

ISAAC PARDEE.

Witnesses:
JOHN M. SIMKINS,
JAMES CHANCE.